United States Patent [19]

Kunig

[11] 3,833,083

[45] Sept. 3, 1974

[54] DETECTION OF ABSENCE OF CONCENTRATION AND COHERENCE IN A SUBJECT

[76] Inventor: Horst Kunig, R.D. No. 1, Saltsburg, Pa. 15681

[22] Filed: Jan. 8, 1973

[21] Appl. No.: 321,689

[52] U.S. Cl.................. 180/99, 307/10 R, 356/154
[51] Int. Cl............................................. B60k 27/08
[58] Field of Search......... 180/99; 73/432; 340/279, 340/52; 35/22 R; 307/10 R; 200/42 R; 356/153, 154

[56] References Cited
UNITED STATES PATENTS

| | | | |
|---|---|---|---|
| 970,410 | 9/1910 | Wilson | 200/42 R |
| 2,305,775 | 12/1942 | Hansen | 356/154 |
| 2,508,146 | 5/1950 | D'Elia | 35/22 R |
| 3,311,187 | 3/1967 | Haggard, Jr. | 180/99 |
| 3,357,115 | 12/1967 | Kelley | 35/22 R |
| 3,485,561 | 12/1969 | Ewald | 356/154 |
| 3,488,053 | 1/1970 | Patel | 35/22 R |
| 3,735,381 | 5/1973 | Zadig | 340/279 |

Primary Examiner—Kenneth H. Betts
Assistant Examiner—Jack D. Rubenstein
Attorney, Agent, or Firm—Hymen Diamond

[57] ABSTRACT

Absence of concentration and coherence in a subject is detected by evaluating the success which the subject has in moving a first object into engagement with a second object over a path which permits the first object to deviate from direct movement to the second object. The moving operation which the subject carries out is not directly visible to the subject; he sees only direct and reverse images of the movement which merge when the second object is engaged by the first object. Deviations from direct movement appear oppositely on the direct and reverse images and the images cannot be coordinated by a subject lacking concentration and coherence. The invention is applied to the movement of a connecting mechanism to energize the ignition of an automotive vehicle. A drunken driver would be unable to effect this movement and start the vehicle successfully.

5 Claims, 7 Drawing Figures

PATENTED SEP 3 1974  3,833,083

DETECTION OF ABSENCE OF CONCENTRATION AND COHERENCE IN A SUBJECT

BACKGROUND OF THE INVENTION

This invention relates to the art of determining the condition of a subject by observing his success in carrying out a pattern of actions. It has particular relationship to the evaluation of the concentration and coherence facilities of a subject by observation of such success. Concentration is defined as the faculty of successfully accomplishing a goal which requires an extended operation to which attention must be devoted as the operation progresses. Coherence is the faculty of continuously carrying out the operation leading to the goal. Lack of concentration delays or aborts entirely the accomplishment of the goal; lack of coherence results in discontinuous action in the operation which precludes accomplishment of the goal. It is an object of this invention to provide a facility for evaluating the concentration and coherence facilities of a subject.

Concretely, this invention relates to preventing an inebriated person from driving an automotive vehicle. It is an object of this invention to provide a reliable facility for preventing a drunken person from starting an automotive vehicle.

Automotive vehicles which have facilities for accomplishing this object, in accordance with the teachings of the prior art, include numbered push buttons on the dashboard. On insertion of the ignition key and the enabling of the vehicle circuit, several random digits appear on the dashboard. The driver is required to operate the push buttons in the order given by the digits within a predetermined time interval to enable the ignition of the vehicle. If he fails on several tries the ignition is entirely disabled for a predetermined interval.

This facility for reducing driving by inebriates has the disadvantage that moderately inebriated persons, whose driving skill is substantially impaired, can frequently successfully operate the push buttons. It is an object of this invention to overcome this disadvantage and to provide a vehicle which shall not lend itself to starting by an inebriated person whose driving skill is to any appreciable extent impaired.

SUMMARY OF THE INVENTION

This invention arises from the realization that the prior-art push-button facility for suppressing driving by inebriates is not reliable because it evaluates only the concentration faculty. It has been realized that greater reliability is achieved by evaluating the coherence faculty as well as the concentration faculty.

In accordance with this invention both concentration and coherence are evaluated with apparatus including a first object and a second object. The first object is moveable by the subject under evaluation into engagement with the second object over a path permitting the first object to deviate from direct movement aligned with the initial position of the first object into engagement with the second object. The second object is not visible to the subject and the movement of the first object is "blind." Direct and reverse images of the objects and of the movement of the first object to the second object are presented on a screen visible to the subject and serve as an aid to achieving successful engagements of the first and second objects. On engagement of the objects the images merge. If the movement of the first object is direct and continuous, the images present directly opposite continuous movement and the engagement is readily effected. If the movement deviates from direct movement, the images present displacement in opposite directions of the objects as they deviate from the aligned track and successful engagement requires a high degree of concentration. Discontinuous movement of the first object enhances the difficulty of achieving engagement to a point at which it becomes not feasible.

In an automotive vehicle the first object is the ignition key or part of a mechanism, which may be unlocked by a key, and the second object is a connector which must be engaged by the key or by a plug connected to the mechanism to close the ignition circuit. To achieve this purpose the operator must move the key or the plug into engagement with the connector. A person under no influence of alcohol is readily able to move the key or plug directly into engagement with the connector even without viewing the images. A person under slight influence of alcohol may have difficulty in effecting the connection but if he is sober enough to be able to concentrate on the screen and execute the directed movements, he will be able to start the vehicle. Under such circumstances the person has the necessary concentration and coherence to operate the vehicle. A moderately or highly inebriated person would have neither the concentration nor the coherence to start the vehicle. This mode of evaluation is applicable to aircraft pilots as well as automobile drivers.

BRIEF DESCRIPTION OF THE DRAWING

For a better understanding of this invention, both as to its organization and as to its method of operation, together with additional objects and advantages thereof, reference is made to the following description, taken in connection with the accompanying drawings, in which.

DETAILED DESCRIPTION OF EMBODIMENTS

Figure 1:
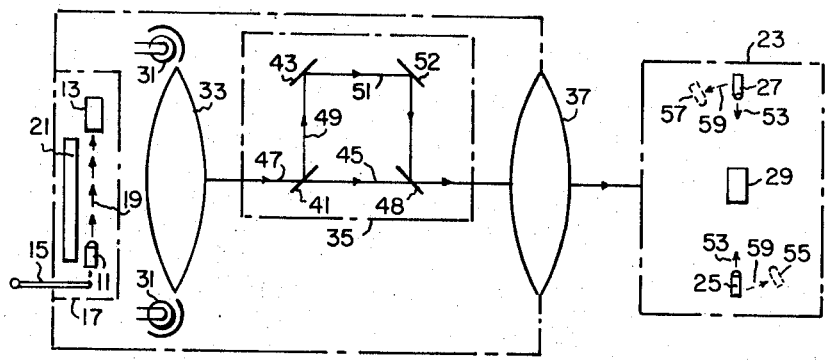
FIG. 1 is a diagrammatic view illustrative of this invention in its general aspects.
Figure 2:
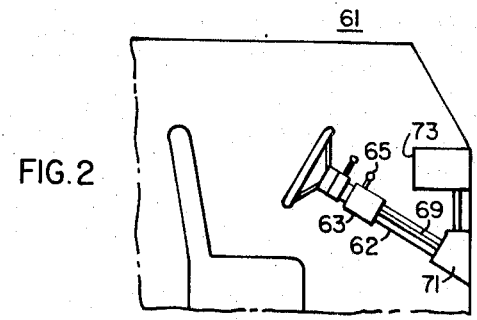
FIG. 2 is a fragmental view of an automotive vehicle showing the manner in which this invention is applied to such a vehicle.
Figure 3:
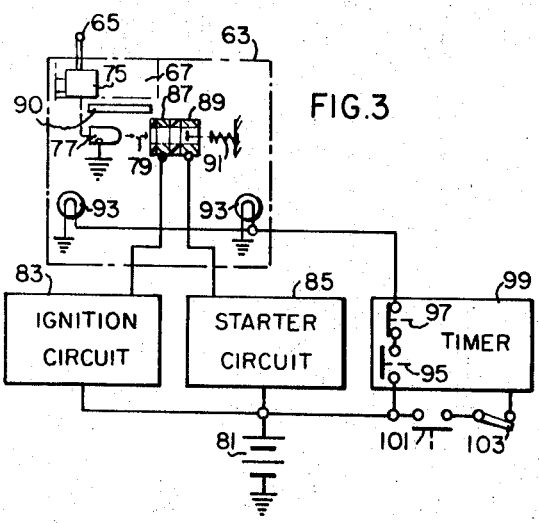
FIG. 3 is a diagrammatic view showing the important features of this invention embodied in the apparatus shown in FIG. 1 and illustrating the manner in which this invention is applied to an automotive vehicle.

The apparatus shown in FIG. 1 includes a moveable object 11 which is to be moved into engagement with an object 13 by operation of a lever or handle 15. The movement is to take place over a path 17 which permits the movement to deviate from the direct line or track or course 19 between the objects 11 and 13. The object 11 is of ferromagnetic material and is urged out of the track 19 by a magnet 21 to enhance the difficulty of direct movement.

The object 13 and a substantial part of the track 17 are not directly visible to the subject moving the object 11 but the subject may view his progress on screen 23. The screen 23 shows direct and reverse images 25, 27, 29 of the object pairs 11–13 and of the movement of the object 11.

To produce the images the apparatus includes an optical system having sources 31 for projecting light on the objects 11 and 13 and on the path 17. The apparatus also includes a collimating lense or lense system 33, a split-image transmitter 35 and a lense or lense system 37 for focusing images of the objects 11 and 13 and the path 17 on the screen 23.

The split-image transmitter 35 includes a beam splitter 41 and a full reflector 43. The beam splitter 41 transmits a part 45 of the incident beam 47 directly to the lense 37 through a beam splitter 48 and reflects another part 49 to the reflector 43 which reflects a beam 51 to reflector 52, whence it is reflected by beam splitter 48 to the lense 37 in coincidence with beam 45. The beam 45 produces a direct image 25–29 of the objects 11–13 and the movement, and the beam 51 produces a reverse image 27–29 of the objects and the movement. If the object 11 is moved directly the images 25 and 27 will be seen to move directly toward the image 29 from opposite directions as represented by arrows 53. If the object 11 deviates from the direct track 19, the images move in opposite directions as represented by the images 55 and 57 and the arrows 59. Considerable concentration and coherence is then required to effect engagement of the objects 11 and 13 with the aid of the viewing screen 23.

The apparatus shown in FIGS. 2 through 7 includes a vehicle 61 having a steering wheel and column 62 provided with the conventional facilities but in addition including a casing 63 from which a lever 65 extends so that it can be moved by an operator of the vehicle 61. The lever 65 is moveable over a path 67 of the casing 63 which permits substantial deviation from any selected track. The casing 63 is connected by a tubulation 69 extending through the steering column 62. At the end of the tubulation 69 there is a split-beam unit 71 whose optical output is projected on a screen 73.

A lock 75 is connected to the lever 65. In the quiescent condition of the vehicle 61, the lock 75 is secured so that the lever 65 is not moveable. A plug 77 extends from the lock 75 and when the lock is unlocked the plug 77 is moveable over a path 79 corresponding to the path 67.

Figure 5:
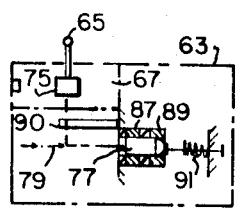
FIGS. 5 and 6 are diagrammatic views referred to FIG. 3 and showing the manner in which a sober and competent operator would start a vehicle in the practice of this invention.
Figure 6:
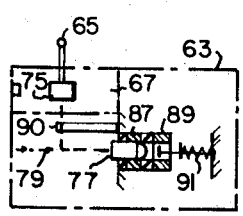
Figure 7:
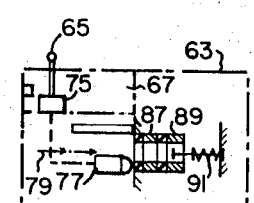
FIG. 7 is a diagrammatic view referred to FIG. 3 showing the manner in which an inebriated operator would fail to start the vehicle.

The vehicle 61 also includes a battery 81, an ignition circuit 83 and a starter circuit 85. Circuits 83 and 85 are connected to the battery 81 at one terminal and to respective rings 87 and 89 at the other terminal. Rings 87 and 89 are at the end of path 79 and are adjacent but insulated from each other. If lever 65 is manipulated in the proper track as shown in FIGS. 5 and 6, plug 77 is passed through ring 87 completing the ignition circuit 83 and then through ring 89 completing the starting circuit. There is a spring 91 at the end of ring 89 which is compressed by the lever 65 through the plug 77 as shown in FIG. 5. When the lever 65 is released the spring 91 retracts the plug 77 disconnecting it from ring 89 while it remains connected to ring 87. Such disconnection is effected after the vehicle is started. On improper manipulation of the lever 65 the plug 77 fails to engage the rings 87 and 89 as shown in FIG. 7. Analogously to the apparatus shown in FIG. 1, the plug 77 may be composed of ferromagnetic material and a magnet 90 may be included to enhance the difficulty of direct movement.

There are light sources 93 for illuminating path 79 and plug 77 and rings 87, 89. These sources 93 are adapted to be temporarily connected in a circuit to be energized by the battery 81 through a normally open contact 95 and a normally closed contact 97 of a timer 99. The timer 99 is enabled by the closing of a door switch 101 when the door is opened and reclosed. On being enabled the timer 99 closes contact 95 energizing the sources 93. After a predetermined time interval, say five minutes, the timer 99 times out opening contact 97 and deenergizing the sources 93. The operator may reenable the timer 99 by momentarily reopening and then reclosing the timer circuit with panel switch 103.

The split-beam unit 71 includes beam splitters 111 and 113 and reflecting prisms 115 and 117. The optical apparatus also includes a collimating lense or system 119, condensing lense 121 and lense 123 which focuses the light passed by beam-splitter unit 71 onto the screen 73. The light is appropriately reflected to the lense 123 by reflectors 125 and 127.

Figure 4:
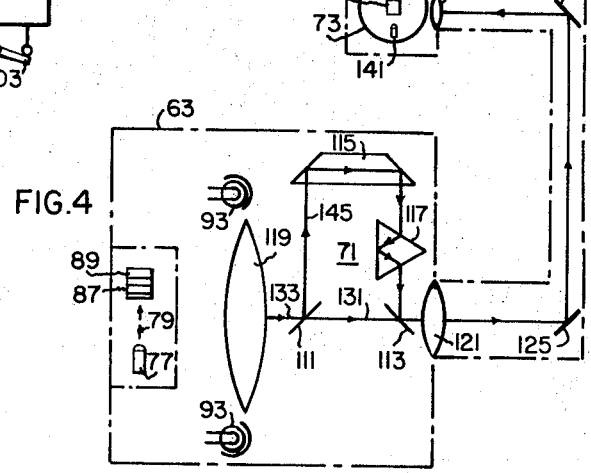
FIG. 4 is a diagrammatic view showing the imaging system of the apparatus shown in FIGS. 2 and 3.

The portion 131 of incident beam 133 which passes only through the beam splitters 111 and 113 and is reflected twice by reflectors 125 and 127 produces a direct image 141–143 on screen 73 (FIG. 4). The part 145 of incident beam 133 which is reflected thrice by prisms 115 and 117 produces a reverse image 147–143 on screen 73.

In the use of this apparatus, the operator of the vehicle unlocks the lock 75 and tries to guide the plug 77 through the rings 87 and 89 aided by the images on screen 73. If he is sober he encounters no difficulty. If he is under the influence of alcohol he moves the plug 77 in a path not aligned with the rings 87 and 89 and, if the influence is between moderate and high, incoherently, and he cannot take advantage of the images on the screen 73. The inebriated operator thus fails to start ignition of the vehicle. In a short time the timer 99 times out and the image disappears from the screen 73. The operator can try again but the result will be the same.

While preferred embodiments of this invention have been disclosed herein, many modifications thereof are feasible. This invention should not be restricted except insofar as is necessitated by the spirit of the prior art.

I claim:

1. An automotive vehicle including a power supply, ignition means for said vehicle energizeable by said power supply, said ignition means including first electrical connecting means and second electrical connecting means, said second means being spaced a predetermined distance, and disconnected, from said first means in the quiescent condition of said vehicle and movement of said second means over said distance being required to effect connection of said second means and first means, means, operable by the operator of said vehicle, to move said second means along a direct path over said distance to effect electrical connection with said first means and also operable by said operator to move said second means along paths deviating from said direct path, return of said second means from said deviating paths to said direct path, before said second means traverses said distance, being required to effect connection of said second means and said first means, means for connecting said power supply to said ignition means through said first and second electrical-connecting means on electrical connection of said first and second means to energize said ignition means to produce ignition for said vehicle, said second means as it moves over said distance being hidden from the direct view of said operator, but being capable of being optically imaged, and means for producing a visual optical image, visible to said operator, of said movement of said second means to enable an operator having adequate concentration and coherence faculties, by concentration on said image and continuous maintenance of said second means along said direct path, to move said second means to effect electrical connection with said first means and to prevent an operator lacking such adequate concentration and coherence faculties from moving said second means to effect electrical connection with said first means.

2. The apparatus of claim 1 wherein the visual-image producing means produces both a direct image and a reversed image of the movement of the second means to effect electrical connection with the first means, said images to be coordinated by the operator in desirably moving the second electrical-connecting means to effect electrical connection with the first electrical-connecting means.

3. The apparatus of claim 2 wherein the direct path is generally linear and the direct and reversed images of said path are generally collinear.

4. The apparatus of claim 1 wherein the direct path is generally linear.

5. The apparatus of claim 1 wherein the producing means includes timing means for limiting the time interval during which the operator can effectuate the electrical connection of the second means and the first means to an interval within which an operator having adequate concentration and coherence faculties can readily effectuate such engagement.

* * * * *